Patented Nov. 19, 1940

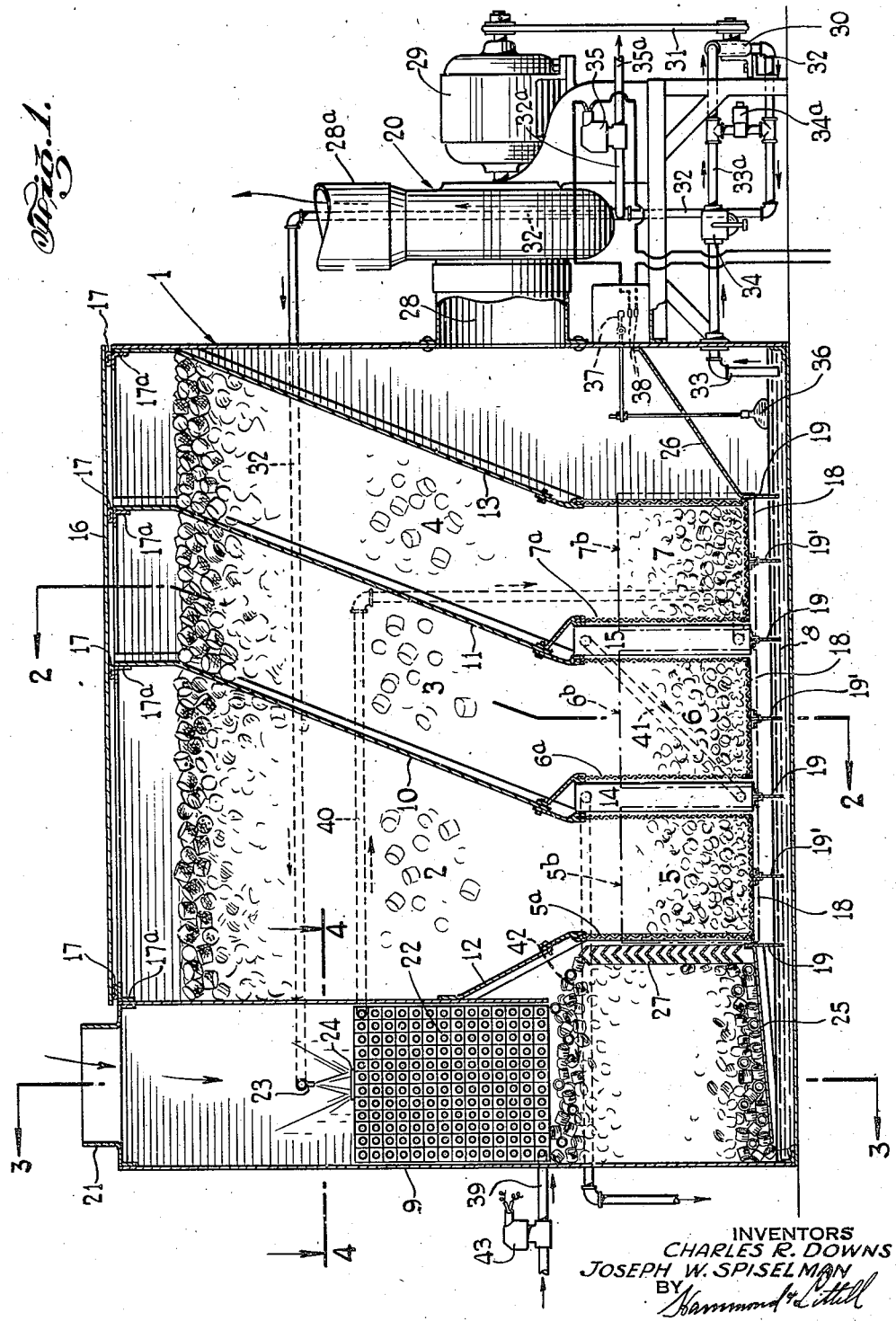

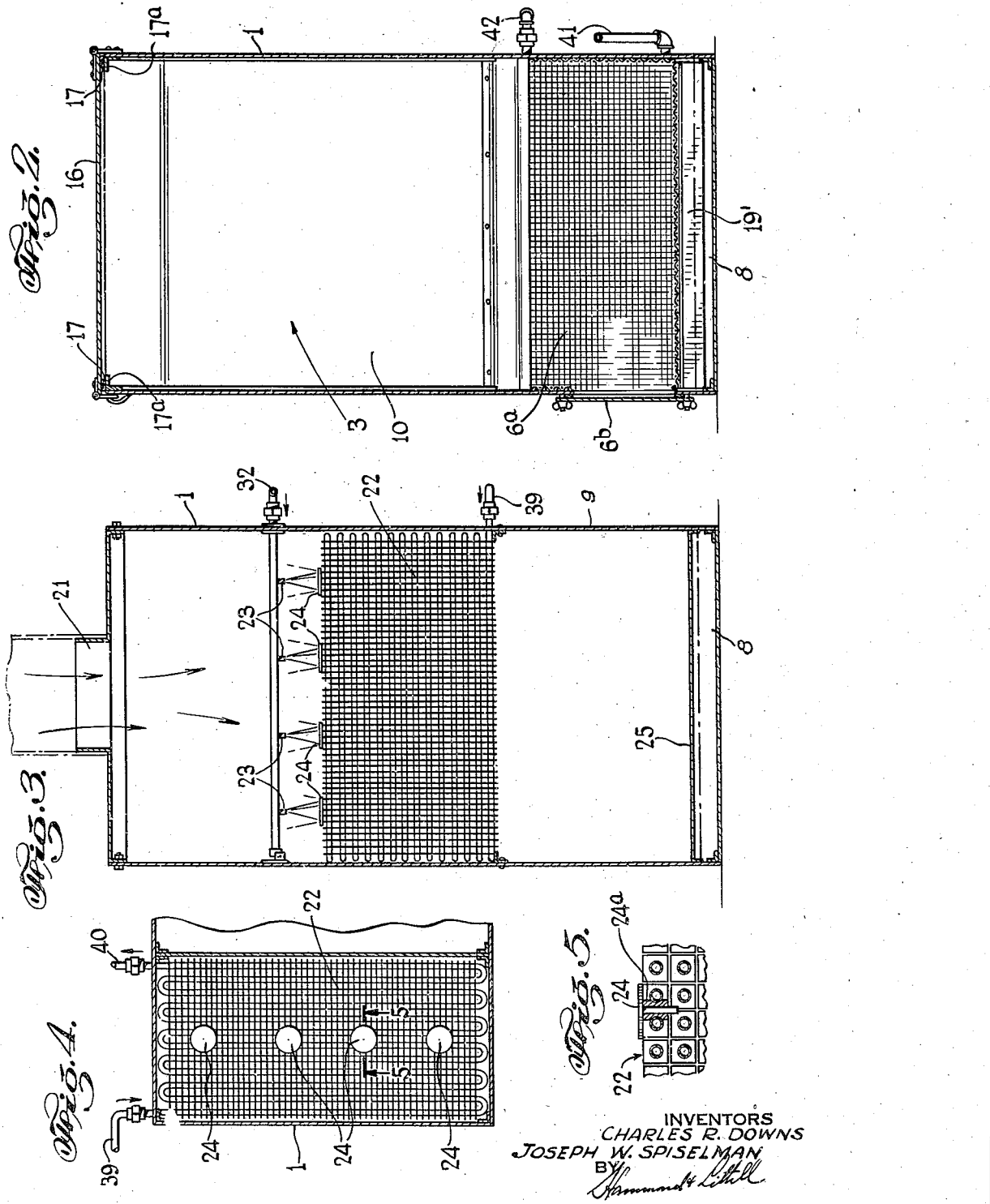

2,221,786

UNITED STATES PATENT OFFICE 2,221,786

METHOD AND APPARATUS FOR CONDITIONING AIR

Charles R. Downs, Old Greenwich, Conn., and Joseph W. Spiselman, Brooklyn, N. Y., assignors, by mesne assignments, to The Calorider Corporation, Greenwich, Conn., a corporation of Connecticut Application January 2, 1936, Serial No. 57,148

9 Claims. (Cl. 183—4)

The present invention relates to improvements in the art of controlling the humidity of air or gases to suit the comfort of individuals or to suit the requirements of manufacturing processes and the like.

One object of the invention is to provide an improved method and apparatus for dehumidifying air or other gas to maintain a predetermined moisture content.

Another object of the invention is to provide an improved method and apparatus for dehumidifying air which makes a more efficient use of the dehumidifying material such as calcium chloride for example by causing the air to flow in contact with calcium chloride solution through a cooling device and through solid beds of calcium chloride and the calcium chloride liquefied in the beds being used to enrich the calcium chloride solution used in the cooling device. More in particular, an important object of this invention is to provide a novel method and apparatus for dehumidification of air or other gaseous fluid characterized by the confluent contact of the gaseous fluid and a hygroscopic liquid in thin layers while heat is being removed from the liquid in contact with the gaseous fluid.

Another object of the invention is to provide an improved arrangement for supporting a solid deliquescent material such as calcium chloride whereby the apparatus can be more readily cleaned when the season for its use is over.

Another object is to improve the drainage of the solution of deliquescent material formed when air or other gas is dehumidified by contact with solid deliquescent material.

The present invention constitutes an improvement over that defined in the prior application of Charles R. Downs, Serial No. 672,415, which became Patent No. 2,026,936, issued Jan. 7, 1936, and is a continuation in part of application Serial No. 21,326, which became Patent No. 2,174,186, issued Sept. 26, 1939.

In the arrangement to be more particularly described for the purpose of illustrating the invention, the deliquescent solid, which may be calcium chloride, is supported in a plurality of separate beds above a tray of dilute solution into which the concentrated solution, formed as the solid calcium chloride absorbs moisture, drips from the beds and enriches the dilute solution. The enriched solution, together with air to be dehumidified, is passed simultaneously through a cooling and liquid phase drying zone, in heat exchange relation but not in contact with a suitable cooling fluid, where the air is partially dehumidified by the solution and may be cooled. After this preliminary drying, the air is passed through the beds of the solid calcium chloride.

Preferably, this cooling and liquid phase drying is accomplished by distributing the hygroscopic liquid or solution over the extended surfaces of a finned tube heat exchanger and simultaneously passing air through the exchanger in confluent contact with thin films of the hygroscopic liquid or solution and passing cooling fluid through the tubes of said heat exchanger to absorb and remove the heat generated and released at and in the hygroscopic liquid or solution.

The relatively thin films of solution formed by circulating a relatively small quantity of liquid over a large extended surface are conducive to a rapid transfer of the generated heat from the air-liquid interface to the liquid-metal interface and a substantially isothermal system is thereby provided. The turbulence created in the air stream and in the liquid films also is beneficial to increased rates of vapor and heat transfer.

Our present invention may be made clear by the following example which is for illustrative purposes only.

Assume that 9 pounds of water are to be removed from 60,000 cubic feet of air per hour whose temperature is 75° F. by means of a 40 percent calcium chloride solution which, at a temperature of 75° F., is spread over the fins of a finned tube radiator. The air passes through the radiator at about 700 lineal feet per minute. The solution leaves the finned tube radiator at 75° F., is enriched to its original calcium chloride content and returned to the surfaces of the finned tube radiator. The extended surface of the finned tube radiator has an area of 100 square feet which acts as the liquid-air contact surface and as the heat removing surface although the radiator occupies a volume of only about 1½ cubic feet. The 100 square feet of extended surface is that desirable as the exposed area of liquid surface for absorption of the moisture load and is also substantially the proper area to carry the generated heat from the solution to the cooling fluid within the conduits of the radiator. A suitable flow of solution over the fins of the radiator is approximately one gallon per minute.

By the arrangement described, the calcium chloride solution and air are passed in intimate contact with each other through the radiator and therefore over a very extended cold surface. The space required for this liquid phase treatment is very materially reduced as compared with the arrangement shown in Patents 2,026,936 and 2,174,186 above referred to, wherein the calcium chloride solution was circulated through pools and the air was passed over the surface of the pools.

It is also an advantage of the improved construction that the solid calcium chloride is supported in baskets in the separate compartments of the solid phase drying zone. In the arrangement shown, the whole bottom of the container for the solid material is of more or less open construction providing greater freedom of flow for the concentrated solution formed by the absorption of moisture and even permitting small solid particles of calcium chloride to drop through into the solution below. Such removal of the small solid particles from the compartments assists in providing improved liquid drainage from the beds of lumps contained in the baskets and also reduces the resistance to air flow through the solid phase drying zone especially in its lowest level.

Provision is made whereby a dead air space is provided beneath each basket to prevent the cooling of the bottom of the baskets. The baskets are also so constructed that they are free of contact with the cooling units or any structural parts which may become chilled and therefore locally cool the baskets or the calcium chloride therein. This provision reduces the possibility of a congealing of the concentrated solution in the lower part of the basket to stop the flow therethrough.

The drawings of this application illustrate the improved combination of liquid phase and solid phase drying, and the claims are directed particularly to such a combination and to features of the solid phase drying. The improved liquid phase drying is disclosed with further illustrative details and claimed in our co-pending application, Serial No. 98,646, which is in part a continuation of this application.

The various features of the invention will be better understood from a consideration of a particular illustrative embodiment, for the purpose of which description reference should be had to the accompanying drawings forming a part hereof and in which:

Figure 1 is a vertical longitudinal sectional view of an air conditioning apparatus embodying the invention;

Figure 2 is a transverse vertical sectional view taken on the line 2—2 of Figure 1;

Figure 3 is a transverse vertical sectional view taken on the line 3—3 of Figure 1;

Figure 4 is a sectional view taken on the line 4—4 of Figure 1; and

Figure 5 is a detail view showing one of the splash plates.

In the illustrative apparatus shown, the casing 1 may be conveniently considered as divided into four zones. These are the bin zone containing the three bins or hoppers 2, 3 and 4; the solid phase dehumidifying zone containing the three compartments 5, 6 and 7; the liquid reservoir zone 8, and the liquid phase air contact zone 9. The three bins are separated from each other by the slanting partition walls 10 and 11 which extend across the casing between the front and rear vertical walls to both of which they are fastened. The bins 2 and 4 are separated from other parts of the casing 1 by the same type of slanting partitions 12 and 13. The compartments 5, 6 and 7 are separated from each other by heat exchange units or radiators 14 and 15, shown as of the fin tube type, which extend across the casing 1 between the front and rear walls and are supported thereby.

Within these compartments 5, 6 and 7 are preferably provided wire mesh baskets 5a, 6a and 7a, for holding the deliquescent solid. These are suitably suspended in the compartments. As shown, basket 5a is hooked or otherwise fastened to the lower edges of partitions 12 and 10, basket 6a similarly to partitions 10 and 11 and basket 7a to partitions 11 and 13. These baskets are removable for convenience in cleaning the apparatus and when removing all calcium chloride after the summer season is over at which time they may be lifted up through the top of the casing. The construction and shape of the baskets may be varied to suit particular requirements or the preferences of users. The calcium chloride can be more easily removed through the front doors 5b, 6b and 7b, as shown in Figures 1 and 2, if the front walls of the baskets are omitted or made with proper openings. There are certain advantages in forming the baskets with rear and front walls which lie so close to the corresponding wall of the casing that no substantial air passage is left between the basket and casing wall. The basket bottoms of wire mesh permit free drainage and even permit small particles of calcium chloride or extraneous material to drop through into reservoir 8. We have found one half inch wire mesh suitable. Preferably the vertical faces and bottoms of these baskets are out of contact with the radiators 14 and 15 adjacent thereto or any supporting parts that are chilled by the radiators in order to avoid local chilling of the calcium chloride solution formed in the baskets.

In order to prevent air flow along the surface of the solution, hanging curtains of sheet metal 19 are suspended from the radiators 14 and 15 and from the plates 25 and 26. These curtains extend across the casing 1 from the front to the rear walls thereof and dip down into the liquid contained in the reservoir 8. The bottom edges of curtains 19 clear the bottom of casing 1 to permit the flow of liquid underneath them. In this way, the liquid seals their lower edges to prevent the air from passing through the device from by-passing the compartments 5, 6 and 7.

Ordinarily a larger number of curtains than shown is not necessary but if desired similar curtains 19' preferably of non-heat conducting material may be suspended from the bottoms of the baskets to further insure the dead air space.

The top of the casing 1 is closed by a lid 16 preferably hinged to the top of the rear wall and when closed it is made tight by gaskets 17 which are copressed against the angles 17a. These gaskets are preferably fastened to the lid 16.

Air enters the casing at 21 and is drawn through the casing by means of the blower 20. The air passes first through the liquid-phase air contact zone 9 in contact with an extended surface heat exchange unit, for example, a finned tube radiator 22 shown therein. While passing through this radiator, the air is in intimate contact with the liquid which is being sprayed on to the upper surface of the radiator by the nozzles 23 and distributed by the splash plates 24. As shown in Figure 5, the splash plates 24 may be conveniently formed with shanks which fit into packing members 24a of rubber or other suitable material wedged into the radiator. The air and liquid as they emerge from the bottom of radiator 22 separate largely by gravity and the liquid falls on to the plate 25 and drains into the reservoir 8. Any spray of liquid entrained in the air is separated therefrom by the spray eliminator 27 which may be of the type shown or of any other suitable structure. Whether or not the spray eliminator 27 is used, the space below the radiator 22 may be partly or completely filled with Raschig rings or other types of tower packings to assist in removing spray from the air.

The air after the spray has been partly or wholly eliminated therefrom passes through the compartments 5, 6 and 7 and the radiators 14 and 15 in series, thence over the plate 26 to the outlet 28, and to the blower 20 from which it is discharged to distributing duct 28a. The blower 20 is driven by the motor 29. It will be understood that the blower may be differently positioned and arranged to discharge air into the casing 1 instead of drawing it from the casing as shown.

The nozzles 23 are supplied with liquid from the pump 30, which is driven by the belt 31, through the pipe line 32. The liquid is drawn by the pump 30 from the reservoir 8 through the pipes 33 and 33a and preferably through a strainer 34. If desired, a by-pass valve 34a may be inserted in a branch between the discharge line 32 and the suction line 33a so that the discharge pressure will be released should the nozzles become plugged. The liquid discharge line 32 has a branch 32a provided with a solenoid valve 35. When the solenoid valve 35 is open, the liquid is discharged through conduit 35a to waste or for further use such as the recovery of lump calcium chloride. The opening and closing of the solenoid valve 35 is controlled by means of a float 36 suspended in the liquid in reservoir 8. When the liquid level rises and raises the float 36, the arm 37 is depressed and this closes an electrical circuit through the contact points 38 thereby causing opening of the solenoid valve 35 and then liquid is discharged by the pump 30 through the conduit 35a until the liquid in the reservoir is reduced to a predetermined level whereupon the arm 37 rises, the contact points 38 are disengaged and the solenoid valve 35 is closed. The size of the orifice in the solenoid valve is such that only a small portion of the liquid discharged by the pump 30 can flow therethrough when open and hence the large bulk of the liquid from the pump 30 is always discharged at nozzles 23 whenever the pump is running.

A heat removing fluid, for example, water, enters the conduits of the radiator 22 through the conduit 39. After passing through this radiator, it passes in series through conduit 40, radiator 15, conduit 41, radiator 14 and conduit 42 to waste or for further use. The path of the heat removing fluid may be in the series as shown or in any other series through the radiators or the radiators may be in parallel. When water is used as the cooling fluid, it may be cooled in a spray tower and used again for removing heat from the apparatus. The flow through conduit 39 may be controlled by a solenoid valve 43 which when closed prevents the cooling fluid from entering the radiator 22 but when electrically energized it is opened and permits the flow of water. The electrical lead wires from solenoid valve 43 and motor 29 are preferably led to humidistatic control device (not shown) in the space containing the air or gas to be maintained in a dry condition so that when the moisture content of the air or gas rises above the setting of the humidistat, the motor 29 is started and the valve 43 is opened. When the humidity of the air or gas is reduced to the desired amount, the humidistat shuts off the motor 29 and the valve 43. It is to be understood that the control may be hand-operated in which case a simple switch is used in place of the humidistat control element.

The operation of the apparatus when used for dehumidifying air or gas is as follows—A solid deliquescent material such as hydrated calcium chloride in lump form is charged into the baskets 5a, 6a and 7a in the compartments 5, 6 and 7 and also into the bins or hoppers 2, 3 and 4. Calcium chloride solution is introduced into the reservoir 8. The motor 29 is then started and air is drawn through the apparatus by the blower 20 following the path described above. At the same time, the calcium chloride solution is drawn from the reservoir 8 by the pump 30 and delivered through the conduit 32 to the fin tube radiator 22 as described above. While the air is passing through the radiator 22 and the compartments 5, 6 and 7, moisture is removed therefrom, a concentrated calcium chloride solution is formed on the surfaces of the lumps contained in the baskets 5a, 6a and 7a which drips into and enriches the more dilute solution in the reservoir 8 and heat is liberated both in the pre-drying zone 9 and in the compartments 5, 6 and 7. This heat is removed by causing a cooling fluid to flow through the radiators 22, 15 and 14 as described above.

As the calcium chloride lumps in the baskets are liquefied and reduced in size individually, their volume is reduced and more lumps feed down from the bins. The concentrated solution dripping off from the lumps increases the level of the liquid in the reservoir 8. The volume of this liquid is furthermore increased in that it has absorbed moisture from the air in the predrying zone. Whenever the volume of the liquid increases enough to raise the float 36 so that the contacts 38 are closed, the valve 35 is opened and solution is discharged to waste until the level is suitably lowered and the valve closed.

As is clear from the foregoing description, the process and apparatus of the present invention offers many novel advantages. The apparatus is compact and efficient. The radiators as well as the baskets for the deliquescent material can be removably secured in the casing facilitating repair. The liquid phase drying zone wherein the air and enriched solution are cooled together is particularly effective and requires relatively little weight and volume of structural parts and a relatively small volume of operating liquid. The unit offers little resistance to air flow and because the cooling is effected immediately at the place of release of heat, a relatively small flow of solution is sufficient permitting the use of a small and quiet pump. The method of operation is such that tipping and movement of the apparatus as a whole will not unduly interfere with its operation and it is therefore adaptable for use on trains, boats and the like.

For a further understanding of several features of the invention and of the method and apparatus described, reference should be had to applicants' copending applications cited above of which this present application is in part a continuation.

The above detailed description of Figures 1, 2, 3, 4 and 5 applies to an apparatus and process wherein both a solid deliquescent material such as calcium chloride and its derived solution is used for drying air or gases. It is to be understood, however, that the liquid phase section of the present invention may be used alone to employ a suitable hygroscopic liquid for the drying of air or other gases as disclosed and claimed in our copending application, Serial No. 98,646, hereinbefore referred to. In that event, the hygroscopic liquid after it has become diluted by the absorption of moisture may be enriched by removing water therefrom, for example by heating the liquid, after which it is preferably cooled and returned to the liquid-phase air contact zone for further use. The enrichment of the liquid may be accomplished also by blowing a gas through it, heated if necessary, by adding more concentrated liquid, by the addition of the hygroscopic constituent thereto or by any other suitable means. It is also to be understood that concurrent flow of the hygroscopic liquid and air over an extended surface heat exchanger and its attendant advantages may be obtained by any arrangement which results in substantially concurrent flow, regardless of the direction of introduction of the liquid and the air, and that we may employ any arrangement instead of that specifically illustrated, in which the liquid and air are conducted to the heat exchanger in the same direction.

The applicability of the invention is not to be determined by the above illustrations but is limited solely by the appended claims.

We claim:

1. The method of conditioning air which comprises circulating air and a hygroscopic solution in intimate contact and confluent flow and in a plurality of fine streams through a cooled extended surface heat exchanger, cooling said exchanger by flowing a cooling fluid countercurrent to said air and hygroscopic solution, separating the air from hygroscopic solution after passage through said heat exchanger, passing the separated air over solid deliquescent material, and continuously draining the solution resulting from the action of the moisture of said separated air on said solid material directly to said first mentioned solution to reconcentrate the same.

2. The cyclical method of dehumidifying air by the use of solid deliquescent material and a solution of the same and in which the air is subjected to multi-phase dehumidification and cooling, which comprises the steps of flowing a solution of said material in intimate contact with and through an extended surface cooler, confluently passing humid air into said cooler while in intimate contact with the solution and withdrawing heat from said solution through the cooler by flowing a cooling fluid countercurrent to said air and solution, separating the air and diluted solution, passing said air through a plurality of beds of solid lumps of said deliquescent material, cooling said air during its travel between adjacent beds, catching the concentrated solution of said deliquescent material which drips from said beds in the aforesaid diluted solution whereby the same is enriched, and recirculating the enriched solution as above.

3. The method of dehumidifying a gaseous fluid such as air, which includes distributing a hygroscopic solution through a current of said gaseous fluid to form an intimate mixture, flowing the mixture in contact with closely spaced, thin heat absorbing elements on which said solution spreads as films flowing in the same general direction with the currents of gaseous fluid, continuously abstracting the heat of moisture absorption by said elements to a cooling liquid flowing countercurrent to said mixture, separating hygroscopic solution from the gaseous fluid, delivering the gaseous fluid through a body of solid deliquescent material to remove further moisture, and restoring the diluted solution separated from the gaseous fluid to the desired concentration by delivering to said solution liquid resulting from the liquefaction of said solid at its rate of liquefaction.

4. In apparatus for dehumidifying air by the deliquescence of calcium chloride or the like, the combination of a plurality of compartments for containing solid hydrated calcium chloride and having separate and independent drains for the solution formed in said compartments by deliquescence of said calcium chloride, a container for receiving the solution directly from the independent drains, a cooling coil having thin, closely spaced, heat conducting members extending externally therefrom to form narrow passages, circulating means for passing the solution from said container through said passages and back to said container, means for passing air through said passages to facilitate the flow of said solution in the same general direction, means for passing a cooling liquid through said coil countercurrent to the flow of said air, means for separating a substantial portion of said solution from said air, and means for passing said air stream through said compartments and through the masses of solid calcium chloride therein after separation from said solution.

5. In apparatus for dehumidifying air by the deliquescence of calcium chloride or the like, the combination of a compartment containing solid deliquescent material and having an air inlet, an air outlet, and a drain into a dead air space for the concentrated solution formed therein by deliquescence, a container for receiving the concentrated solution directly from the drain, and diluted solution from a circulatory system positioned before said compartment, said circulatory system including an extended surface heat exchange unit, means for passing solution from the container and air to be dehumidified in confluent contact with each other through the heat exchange unit and in heat exchange relation to a cooling fluid, means for passing said cooling fluid countercurrent to said air, and means for separating said air from said diluted solution and for returning the latter to said container and the former to said air inlet.

6. An apparatus for dehumidifying a gaseous fluid such as air, including a casing having a finned tube cooler, means for passing a cooling fluid through the tubes of said cooler, a chamber for a solid deliquescent material, means for conducting said gaseous fluid down through said casing and said cooler countercurrent to said cooling fluid and then through said chamber in contact with the solid material, means for spraying a relatively concentrated solution of said solid material into the current of gaseous fluid entering said casing, whereby the gaseous fluid accelerates the flow of the solution through the cooler, a reservoir for relatively concentrated solution supplied to said spraying means and receiving diluted solution from the bottom of said cooler and highly concentrated solution coming from said solid material, and means for removing excess solution.

7. An apparatus for dehumidifying air, comprising a plurality of chambers for solid deliquescent material, each having a reticulated bottom wall, cooling means for removing the latent heat of condensation adjacent to each of said chambers, a liquid collecting chamber beneath said first mentioned chambers, and non-heat conducting baffles between said bottom walls and the liquid in said collecting chamber for preventing bypassing of air beneath said first mentioned chambers.

8. An apparatus for dehumidifying air by the deliquescence of calcium chloride or other deliquescent material comprising a plurality of chambers for solid deliquescent material, cooling means for removing the latent heat of condensation adjacent each of said chambers, a mesh basket for supporting the deliquescent material in each chamber, the lower portion of each basket being free from contact with the cooling means and with heat conducting elements cooled thereby, means for flowing air through said chambers and means requiring said air to flow through said baskets.

9. An apparatus for dehumidifying air by the deliquescence of calcium chloride or other deliquescent material comprising a casing having a plurality of communicating chambers in horizontal series for solid deliquescent material, and doors adjacent said chambers, said chambers communicating thereabove with hoppers, a top closure for said hoppers, cooling means for removing the latent heat of condensation between adjacent chambers, removable baskets for supporting deliquescent material in the chambers, said baskets being open on one side adjacent the doors in said casing.

CHARLES R. DOWNS.
JOSEPH W. SPISELMAN.